2,910,893

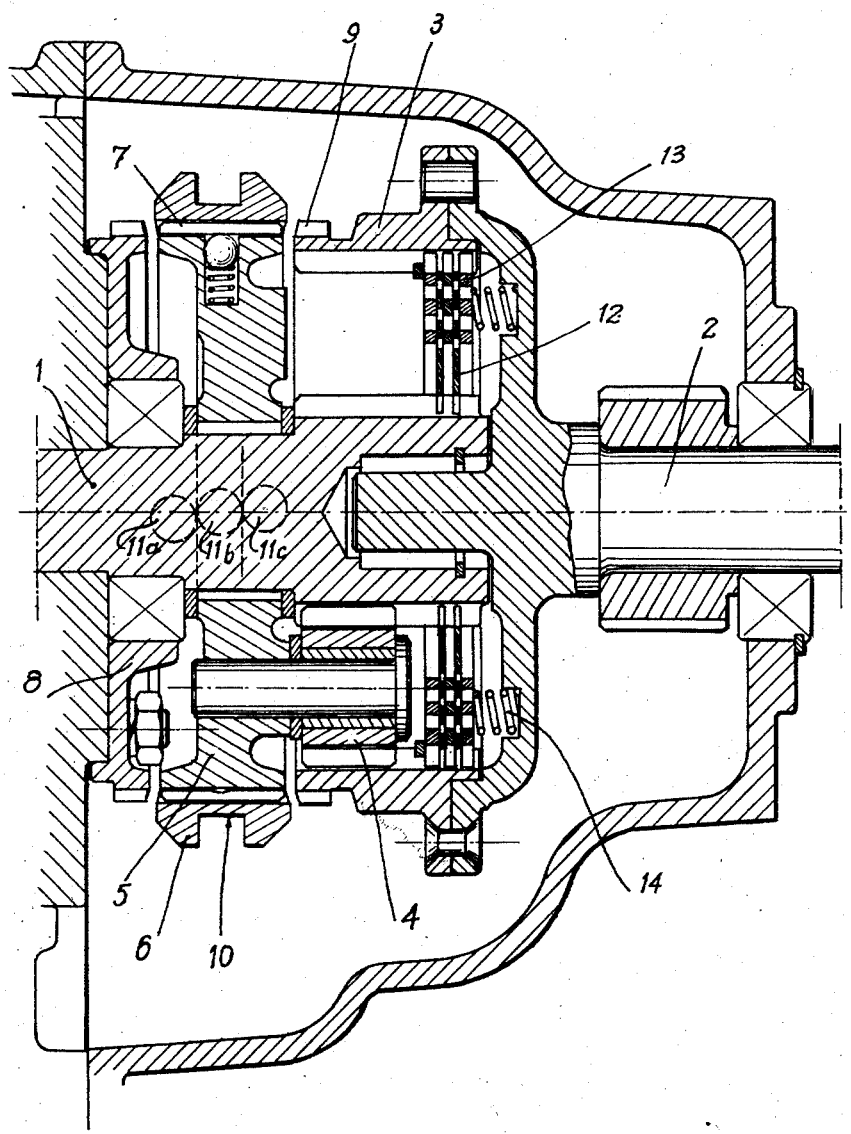

REVERSING DEVICE FOR VEHICLES WITH TORQUE CONVERTER-TRANSMISSION

Lucien Péras, Billancourt, France, assignor to Regie Nationale des Usines Renault, Billancourt, France Application April 4, 1956, Serial No. 576,021

Claims priority, application France May 24, 1955

2 Claims. (Cl. 74—792)

It is known that torque converter transmissions fitted to motor vehicles allow the engine to turn over when the vehicle is stopped with the turbine element of the converter connected to the driving wheels, generally by way of a gearbox. However, the impeller element of the converter transmits a torque which is not negligible to the turbine element, so that the latter is subjected to a rotational tendency in a way which is insufficient to drive the vehicle when the engine is turning over, but nevertheless sufficient to upset mechanical engagement between an element connected to the turbine and an element effecting transmission to the driving wheels, so that it is useful to provide a synchronising device when such engagement is effected by a dog clutch.

This is especially the case as regards the reversing device allowing passage from forward gear to reverse gear and vice versa when it is operated by a dog clutch. In the neutral position of the reversing device, the turbine element and its shaft are separated from the transmission to the driving wheels, and commence to rotate with the impeller, which has a bad effect on rapid operation, and causes noise.

The present invention consists in providing the arrangement of a friction synchronising member consisting of multiple discs alternately connected to one or another of the shafts connected respectively to the turbine and the driving wheels, these discs being constantly subjected to a force tending to move them towards one another by means of suitable springs; this device ensures that the shaft connected to the turbine elements is stationary by absorbing the torque transmitted by the latter when the engine is turning over.

In a form of embodiment which is especially preferred, the reversing device consists of an epicyclic gear train. In this case, one of the series of discs is connected to the internal surface of the annulus, and the other series of discs is connected to the planetary shaft: in this way, the synchronising device is situated inside the annulus, and does not require any additional space.

This form of embodiment will now be described with reference to the attached drawing, in which the single figure is a sectioned elevation of a reversing device according to the invention.

With reference to the drawing, the reversing device intended to be situated in a motor vehicle transmission comprising a torque converter consists of an epicyclic train of which the sun gear is carried by the shaft 1 coming from the turbine, and the annulus 3 is fast with the shaft 2 going to the driving wheels. The planetary gears 4 are fitted on a carrier 5 which is loosely fitted to the shaft 1. The carrier 5 receives a sliding sleeve 6 by teeth 7.

Translational movement in one direction allows the sleeve to engage by way of its teeth 7 with a toothed piece 8 fast with the frame; translational movement in the other direction allows the sleeve to mesh with external teeth 9 carried by the annulus 3. This sleeve is moved by a fork (not shown) engaging in a groove 10 in the sleeve.

For forward gear, the sleeve 6 engages with annulus 3 by way of the teeth 9 and locks the satellites and the annulus so that the assembly rotates in one piece.

For reverse gear, the sleeve 6 meshes with the piece 8, thus holding the satellite-carrier stationary. In this case, the annulus 3 is driven in the reverse direction through the shaft 1.

The locking positions of the fork corresponding to reverse gear, neutral and forward gear are represented at 11a, 11b, 11c.

In order to allow the sleeve to be easily operated, it is necessary to stop the shaft 1 fast with the turbine element of the converter when the device is in neutral. For this purpose, the invention provides a friction coupling situated inside the annulus, and consisting of discs 13 driven by the annulus 3, the discs being constantly applied against one another by means of springs 14 in such a way that the driving torque exerted on the shaft 1 by the turbine element of the converter is absorbed when the engine is turning over by friction between the discs 12 and 13.

In the "neutral" position, the shaft 2 connected to the driving wheels is fixed simultaneously with the latter, and the shaft 1 connected to the turbine is consequently held stationary by the disc friction coupling, which allows shock-free engagement of the teeth.

In the forward gear position, the shaft 1 and the shaft 2 rotate together, and the friction coupling does not play any undesired part during travel.

In the reverse gear position, the shaft 1 and the shaft 2 rotate in reverse directions, overcoming the friction force of the discs 12 and 13, which then slip: there is no disadvantage in this, since this drive only takes place at low speeds for short periods and for a very little lack of torque.

It would naturally be possible to provide variants to the arrangement described without departing from the scope of the invention.

I claim:

1. In a reversing device for selectively coupling for reverse and forward movement a first shaft receiving its power from the turbine element of a torque converter and a second shaft adapted to be driven by said first shaft, a friction clutch disposed between said first shaft and said second shaft, said friction clutch being permanently actuated whereby the driving torque exerted on the first shaft is automatically absorbed by the friction of the friction coupling and selective shifting between forward and reverse may be effected, and gear means for selectively connecting said first shaft with said second shaft for forward and reverse rotation.

2. In a reversing device for selectively coupling for reverse and forward movement a first shaft receiving its power from the turbine element of a torque converter and a second shaft adapted to be driven by said first shaft, a friction clutch disposed between said first shaft and said second shaft, said friction clutch being permanently actuated whereby the driving torque exerted on the first shaft is automatically absorbed by the friction of the friction coupling and selective shifting between forward and reverse may be effected, said reversing device including a fixed frame, an epicyclic gear train having a ring gear fixedly rotatable with one of said shafts, a sun gear carried by the other of said shafts, a planet carrier rotatable about said first-named shaft, planet gears supported by said carrier and meshing with said sun gear and said ring gear, said planet carrier being positioned to be selectively connected with said ring gear and with said frame, and said friction coupling comprising a plurality of first discs and a plurality of second discs disposed in alternating relationship wtih said first discs, said first discs being connected to said first shaft and second discs being connected with said second shaft, said discs being continuously pressed against one another by continuously acting spring means.

References Cited in the file of this patent

UNITED STATES PATENTS

| | | |
|---|---|---|
| 1,907,228 | Weinert | May 2, 1933 |
| 2,120,734 | Cotal | June 14, 1938 |
| 2,498,797 | Duffield | Feb. 28, 1950 |
| 2,502,799 | Nabstedt et al. | Apr. 4, 1950 |